US012128420B2

(12) United States Patent
Adams et al.

(10) Patent No.: US 12,128,420 B2
(45) Date of Patent: Oct. 29, 2024

(54) WORK MACHINE WITH BELT TENSIONING SYSTEM AND METHOD

(71) Applicant: Alamo Group Inc., Seguin, TX (US)

(72) Inventors: Jeffrey Joseph Adams, Mount Pleasant, MI (US); Michael D. Gettel, Mount Pleasant, MI (US); Phillip Patrick Schafer, St. Louis, MI (US)

(73) Assignee: Alamo Group Inc., Seguin, TX (US)

( * ) Notice: Subject to any disclaimer, the term of this patent is extended or adjusted under 35 U.S.C. 154(b) by 266 days.

(21) Appl. No.: 17/719,193

(22) Filed: Apr. 12, 2022

(65) Prior Publication Data
US 2022/0323966 A1 Oct. 13, 2022

Related U.S. Application Data

(60) Provisional application No. 63/174,367, filed on Apr. 13, 2021.

(51) Int. Cl.
*F16H 7/12* (2006.01)
*B02C 18/14* (2006.01)
(Continued)

(52) U.S. Cl.
CPC ............ *B02C 18/24* (2013.01); *B02C 18/146* (2013.01); *B02C 25/00* (2013.01); *F16H 7/0836* (2013.01);
(Continued)

(58) Field of Classification Search
CPC ......... B02C 18/00; B02C 18/06; B02C 18/14; B02C 9/00; B02C 25/00; B02C 21/02; F16H 7/12; F16H 7/1281; F16H 7/08
See application file for complete search history.

(56) References Cited

U.S. PATENT DOCUMENTS 3,819,121 A    6/1974 Rogers
3,992,932 A *  11/1976 Venema .................... G01L 5/04
                                                              73/862.194
(Continued)

FOREIGN PATENT DOCUMENTS

DE    10217115948 A1    7/2017
KR    19980044680 A     5/1998

OTHER PUBLICATIONS

The International Search Report and the Written Opinion of the International Searching Authority mailed Jul. 29, 2022 in corresponding PCT Patent App. No. PCT/US22/24699 (11 pages).

*Primary Examiner* — Bobby Yeonjin Kim
(74) *Attorney, Agent, or Firm* — Pizarro Allen PC

(57) ABSTRACT

A work machine having a belt tensioning system is described. A belt is engaged with an engine drive sheave and a driven sheave of a rotor having a plurality of cutting tools configured for reducing wood infeed material. An idler pulley is mounted to an idler arm that is hinged to the machine frame. An actuator is hinged to the idler arm and the frame. The actuator may be extended and retracted in order to press the idler pulley into stronger and weaker engagement with the belt in order to set the desired amount of tension in the belt. One or more sensors may be used to sense the amount of tension in the belt, and the one or more sensors may be in communication with a control system that controls the actuator to monitor and adjust the belt tension so that it is maintained within desired limits.

20 Claims, 5 Drawing Sheets

(51) Int. Cl.
  *B02C 18/24* (2006.01)
  *B02C 25/00* (2006.01)
  *F16H 7/08* (2006.01)
  *B02C 18/16* (2006.01)

(52) U.S. Cl.
  CPC ...... *F16H 7/1236* (2013.01); *B02C 2018/164* (2013.01); *F16H 2007/0812* (2013.01); *F16H 2007/0861* (2013.01); *F16H 2007/0865* (2013.01); *F16H 2007/0887* (2013.01); *F16H 2007/0893* (2013.01); *F16H 2007/0897* (2013.01)

(56) References Cited

U.S. PATENT DOCUMENTS

| | | |
|---|---|---|
| 6,834,228 B2 | 12/2004 | Serkh et al. |
| 7,267,414 B2* | 9/2007 | Scheetz ................ B62D 55/125 305/141 |
| 7,562,837 B2 | 7/2009 | Brand et al. |
| 8,628,034 B2 | 1/2014 | Bouwers et al. |
| 9,995,374 B2 | 6/2018 | Anstey |
| 10,557,531 B2 | 2/2020 | Herrala et al. |
| 2003/0083803 A1* | 5/2003 | Serkh ........................ F16H 7/12 123/195 A |
| 2006/0276284 A1 | 12/2006 | Lancaster et al. |
| 2011/0073692 A1* | 3/2011 | Bouwers ............... F16H 7/1245 241/101.2 |
| 2015/0372562 A1 | 12/2015 | Brick et al. |
| 2017/0037941 A1* | 2/2017 | Trick .................... F16H 7/1281 |
| 2017/0059014 A1 | 3/2017 | Bailliu et al. |
| 2018/0019638 A1 | 1/2018 | Ben-Omrane et al. |
| 2019/0070746 A1 | 3/2019 | Hanussek et al. |
| 2020/0040970 A1 | 2/2020 | Lamphere |
| 2020/0178482 A1 | 6/2020 | Breja et al. |
| 2020/0325967 A1 | 10/2020 | Veer et al. |
| 2021/0010213 A1* | 1/2021 | Schlenker ............ E01C 23/127 |

* cited by examiner

WORK MACHINE WITH BELT TENSIONING SYSTEM AND METHOD

CROSS REFERENCE TO RELATED APPLICATIONS

This application claims priority to U.S. Provisional Patent Application No. 63/174,367 filed Apr. 13, 2021. The full disclosure of the aforementioned patent application is herein fully incorporated by reference.

FIELD

This application relates generally to belt tensioning systems and work machines.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A number of different work machines are designed for power transmission through transfer of rotational forces between two or more pulleys or sheaves using a drive belt. For example, wood chippers may be used to chip tree stems, tree limbs, branches, brush, wood scraps and other wood debris and typically include a chipper drum and/or grinding mill supported for driven rotation. The drum and/or mill may include a plurality of cutting knives and/or grinding inserts spaced about its perimeter such that when wood debris is fed across the chipper drum the debris may be reduced and turned into wood chips and/or mulch. To power the drum, wood chippers and/or grinders may use a drive belt for power transmission and transfer of rotational force between a drive shaft and a driven shaft. In operation, drive belts may become extended or stretched. When the belt becomes stretched, the belt may tend to slip thereby increasing wear which can result in failure of the belt.

There is a need for improved automatic belt tensioning devices used to reduce slippage and prevent belt failure in machines equipped for belt supported power transmission. There is further a need for electronic and/or hydraulic control systems used to provide for control of belt tension. In particular, there is a need for improved chippers and grinders utilizing such automatic belt tensioning devices and electronic control systems.

SUMMARY

In some embodiments, a work machine for reducing wood infeed material may include a drive motor mounted to a frame, the drive motor including a drive shaft to which a drive sheave is attached, and a rotor including a driven sheave and a plurality of cutting tools configured for reducing the wood infeed material. A belt may be operably engaged with the drive sheave and the driven sheave to facilitate rotation of the rotor. The machine may include a belt tensioning system having an idler pulley mounted to an idler arm, wherein the idler arm is pivotably connected to the frame, an actuator connected to the idler arm, the actuator being configured to move the idler arm to adjust a degree of engagement between the idler pulley and the belt, and an electronic control system. The electronic control system may include a computer processor configured to receive one or more sensor signals representative of a tension of the belt, determine a value for the tension based on the one or more sensor signals, compare the value to one or more belt tension criteria, and provide a control signal to the actuator if the value does not meet the one or more belt tension criteria, the control signal controlling actuation of the actuator, and one or more sensors in communication with the computer processor, the one or more sensors configured to generate the one or more sensor signals.

In some embodiments, a work machine for reducing wood infeed material may include a drive motor operably mounted to a frame, the drive motor including a drive shaft to which a drive sheave is attached, and a rotor including a driven sheave and a plurality of cutting tools configured for reducing the wood infeed material. A belt may be operably engaged with the drive sheave and the driven sheave to facilitate rotation of the rotor. The machine may include a belt tensioning system mounted to the frame including an idler pulley connected to an idler arm, wherein the idler arm includes a first end and a second end, wherein the idler arm is pivotably connected to the frame at the first end, and the idler pulley is rotatably mounted to the idler arm at the second end. The belt tensioning system may further include an actuator connected to the idler arm, the actuator being configured to move the idler arm to adjust a degree of engagement between the idler pulley and the belt. The machine may also include an electronic control system including a computer processor configured to receive one or more sensor signals representative of a tension of the belt, determine a value for the tension based on the one or more sensor signals, compare the value to one or more belt tension criteria, and provide a control signal to the actuator if the value does not meet the one or more belt tension criteria, the control signal controlling actuation of the actuator, and one or more sensors in communication with the computer processor, the one or more sensors configured to generate the one or more sensor signals.

It is an object of some embodiments herein to provide a control signal configured so as to provide for substantially continuous monitoring of a belt tension.

It is an object of some embodiments herein to provide a tension control system that reduces shock and the effects thereof to improve system stability.

DETAILED DESCRIPTION

The following terms as used herein should be understood to have the indicated meanings unless the context requires otherwise.

When an item is introduced by "a" or "an," it should be understood to mean one or more of that item.

"Comprises" means includes but is not limited to.

"Comprising" means including but not limited to.

"Having" means including but not limited to.

A "hinge" may be any connection that permits pivotal movement of the components connected by the hinge with respect to one another. For example, a hinge may include one or more pin connections, rod and sleeve connections, ball and socket connections, or the like.

This disclosure is directed to belt tensioning systems, methods of controlling belt tension, and related machines. For example, in the illustrative embodiment shown in FIGS. 1-3, a belt tensioning system is included in a wood grinding apparatus or grinder 10. However, in some embodiments, a belt tensioning system may be included in other types of machines, such as a wood chipper, for example. In some embodiments, belt tensioning systems described herein may be used to monitor the tension on a belt using feedback control so as to provide substantially constant tension during system operation. In some embodiments, belt tension may be dynamically adjusted so that the tension is varied during the course of machine operation, such as to control operation of a drum or hammermill during start up, or belt tension may be dynamically adjusted for other reasons.

Figure 1:
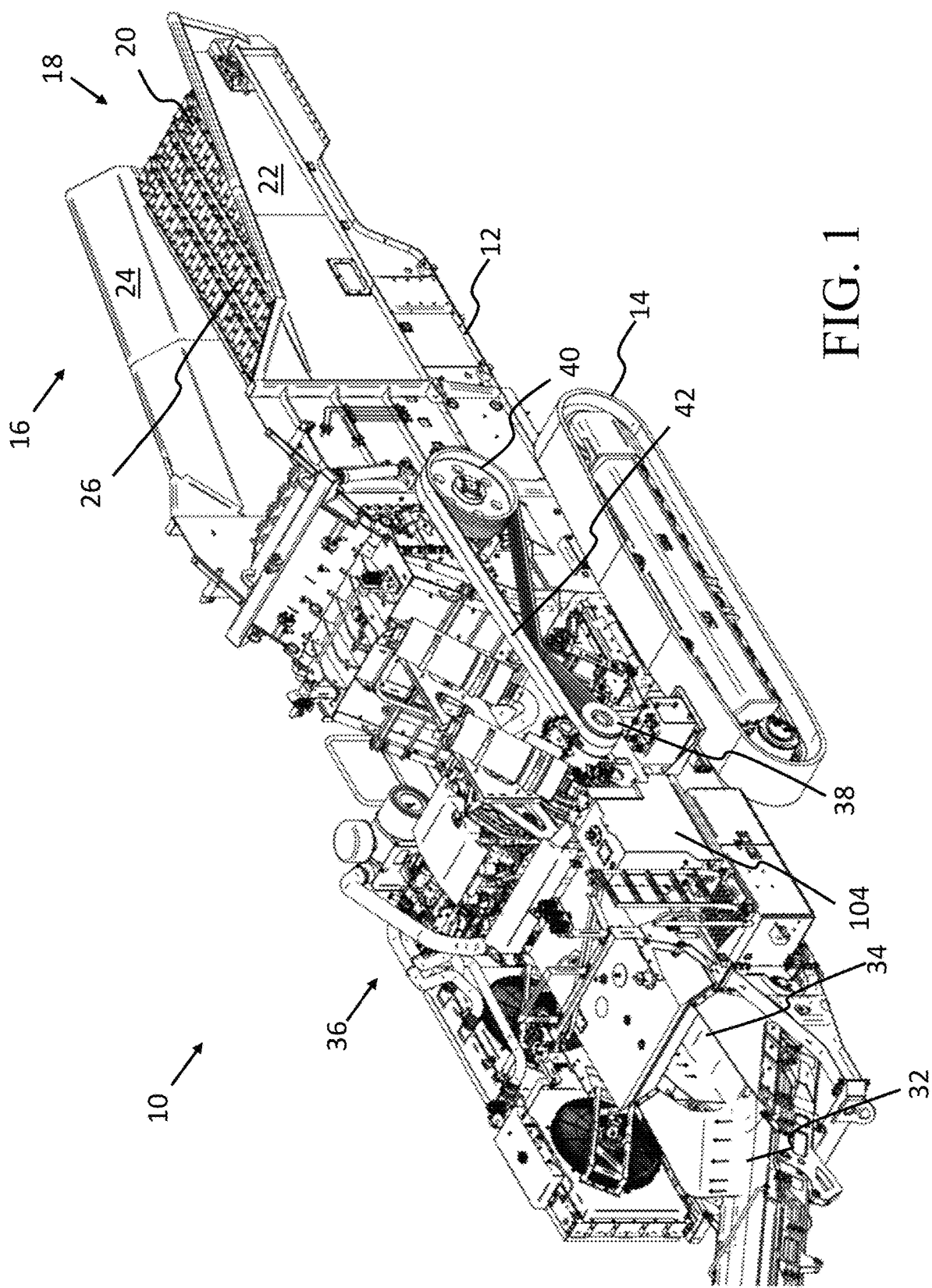
FIG. 1 is a perspective view of a wood grinder including a belt tensioning system.
Figure 2:
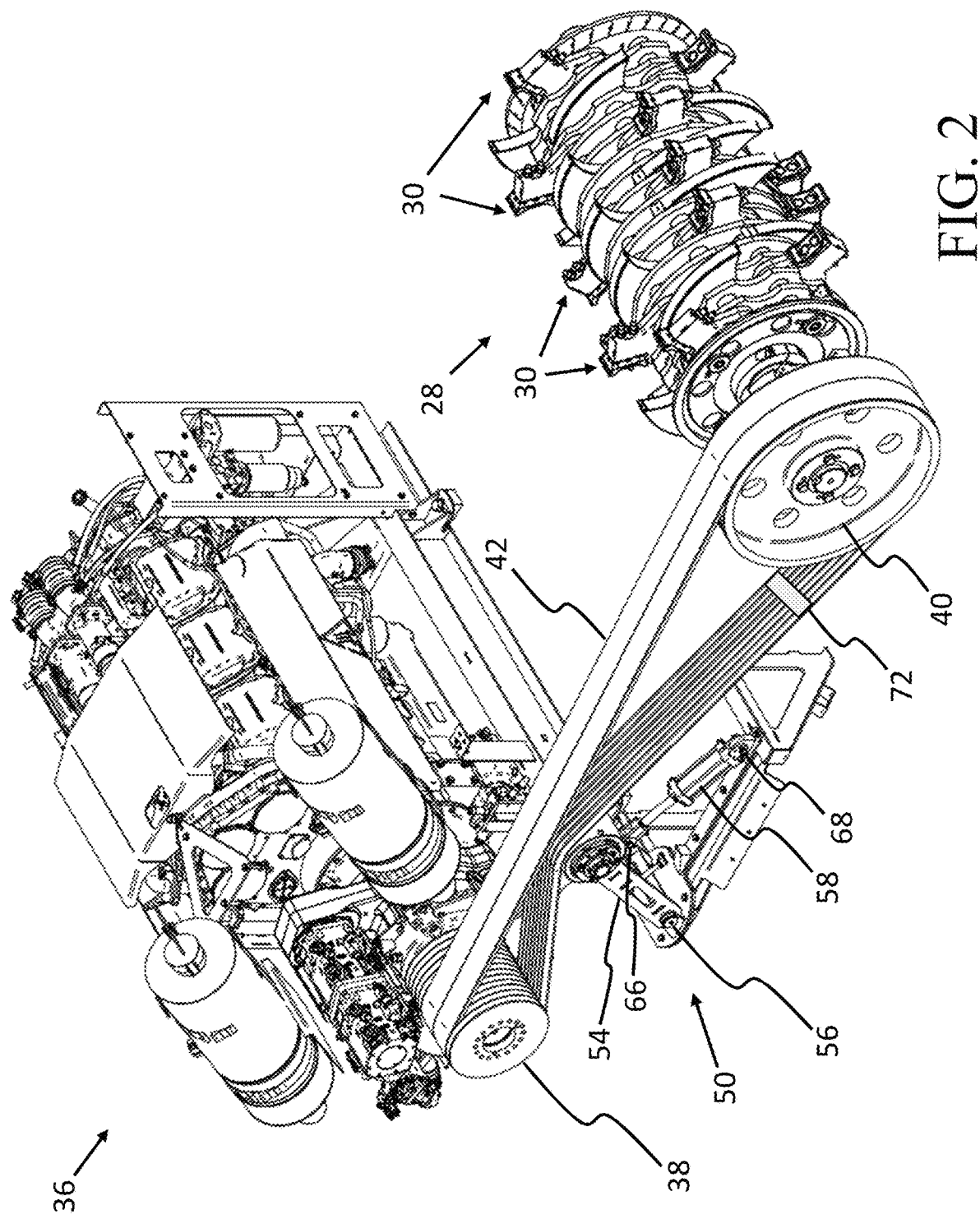
FIG. 2 is a perspective view of the belt tensioning system of FIG. 1 with housing components of the grinder removed to provide a clear view of internal power transmission components and a rotor having a plurality of cutting tools.
Figure 3:
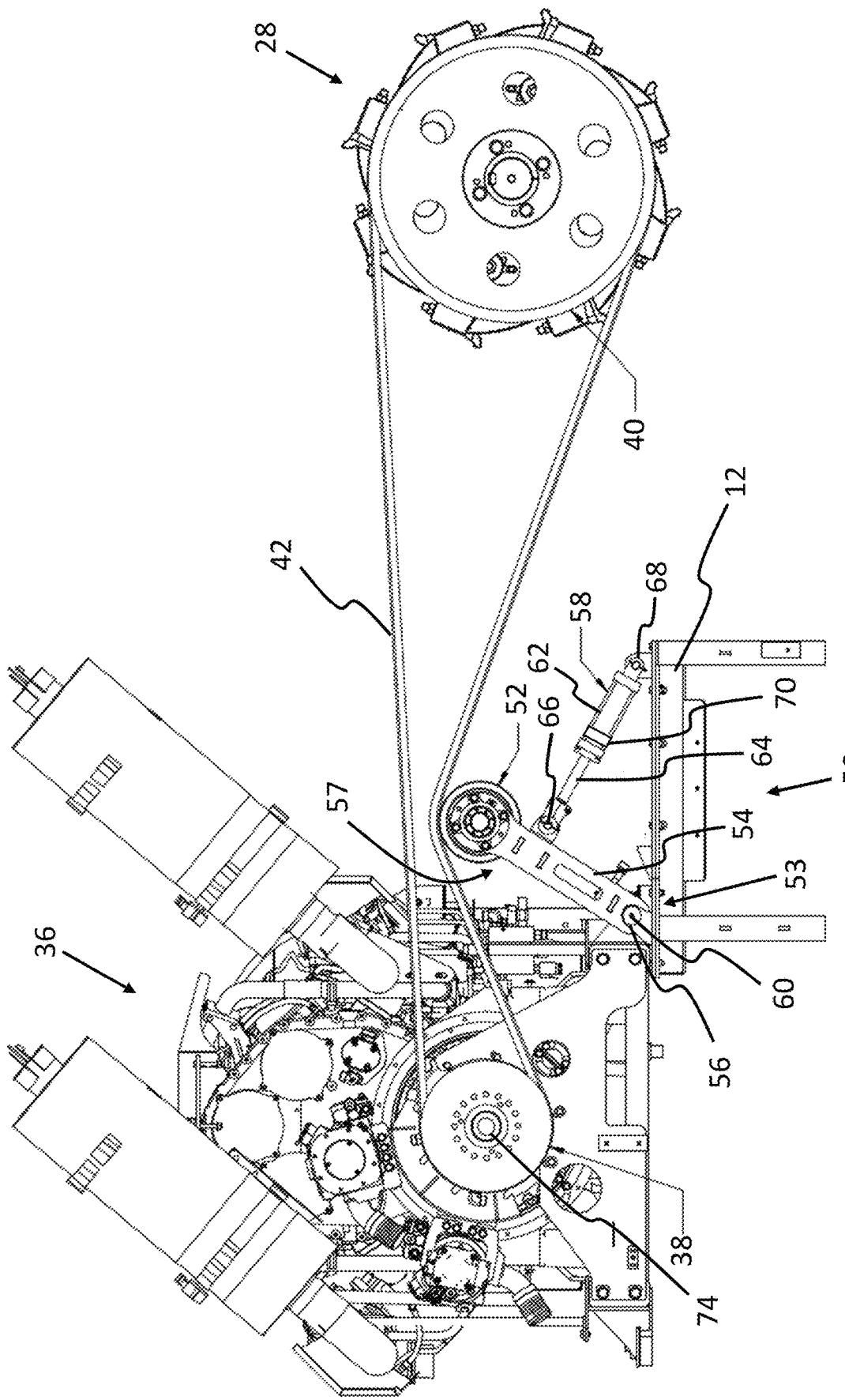
FIG. 3 is a side view of the belt tensioning system of FIG. 2.

In the embodiment shown in FIGS. 1-3, a belt tensioning system 50 may be included in a wood grinding apparatus or grinder 10. The grinder 10 may include a frame 12 such as may be commonly mounted on one or more tracks 14 or wheels, for example. A feed system 16 may include a feed chute 18 comprising a bottom wall 20 and a pair of side walls 22, 24. The feed system 16 may include one or more rollers 26 such as may be used to help guide infeed material, such as branches, trees, brush, or other wood products, for processing using a rotationally driven rotor 28 including a driven sheave 40 and a plurality of cutting or pulverizing tools 30 (referred to generally herein as cutting tools). For example, the driven sheave 40 may be coupled to or part of the rotor 28 upon which the plurality of cutting tools 30 are mounted. The plurality of cutting tools 30 may include, for example, blades, knives, hammers, teeth, or the like, or a combination thereof, configured for cutting, grinding, shredding, crushing, pulverizing, or otherwise reducing the infeed material. Rotor 28 may include, for example, a shaft, drum, mill, hammermill, or other suitable component to which the cutting tools 30 may be mounted. In the illustrative embodiment, the one or more rollers 26 are used to guide infeed material into contact with rotor 28. As infeed material engages the rotor 28, the infeed material may be cut, ground, shredded, crushed, pulverized, or otherwise reduced to wood chips or other particles (generally referred to herein as wood chips for simplicity) by the cutting tools 30. The grinder 10 may also include a discharge chute 32 in communication with a material outlet 34 for use in collecting wood chips as the wood chips are expelled from the grinder 10 for collection in an adjacent bin or towing vehicle, for example.

The rotor 28 is more clearly shown in FIG. 2 and FIG. 3, which show power transmission components and other components of the grinder 10 with housing portions of the machine removed for clarity. As shown therein, a drive motor 36 may be mounted to the frame 12. The drive motor 36 may include a drive shaft 74 upon which a drive sheave 38 is mounted. The drive sheave 38 may be operably connected to the driven sheave 40 using a belt 42. For example, belt 42 may extend around each of the drive sheave 38 and the driven sheave 40. The driven sheave 40 is connected to or part of the rotor 28. Optimal transfer of power between the sheaves 38, 40 may be achieved when the belt 42 maintains a desired level of tension so as to inhibit slippage between the belt 42 and the sheaves 38, 40.

The belt tensioning system 50 may be used to control the tension of belt 42. The belt tensioning system 50 may, for example, be mounted to a chassis or other region of the frame 12 to which the drive motor 36 is mounted. Belt tensioning system 50 may include an idler pulley 52 configured for selective engagement with the belt 42. For example, idler pulley 52 may be pressed into engagement with an outer surface of the belt 42 so as to generate tension in the belt 42 and to encourage engagement of the belt 42 with the sheaves 38, 40. The idler pulley 52 may be mounted on an idler arm 54. Idler arm 54 may include a first end 53 and a second end 57. Idler arm 54 may be pivotably mounted to the frame 12 at the first end 53 through a hinge 56. For example, idler arm 54 may be attached to the frame 12 at hinge 56 using a hinge pin 60. The idler pulley 52 may be rotatably mounted to the idler arm 54 at the second end 57. The idler arm 54 may further be connected to an electronically controlled actuator, such as hydraulic cylinder 58. Hydraulic cylinder 58 may comprise a cylinder barrel 62 and an associated piston rod 64 extendable and retractable therefrom. Hydraulic cylinder 58 may be connected to the idler arm 54 and further secured to the frame 12. For example, hydraulic cylinder 58 may be pivotably connected to idler arm 54 through hinge 66 at or near the second end 57. The hydraulic cylinder 58 may be pivotably connected to the frame 12 through hinge 68. The hinges 66, 68 may include one or more pin connections or rod and sleeve connections, for example. The hydraulic cylinder 58 may be extended and retracted in order to press the idler pulley 52 into stronger or weaker engagement with the belt 42 in order to set or control a desired amount of tension in the belt 42. In some embodiments as shown, belt 42 may be configured in a closed loop, and extension of hydraulic cylinder 58 may press a portion of the belt 42 toward an interior of the closed loop. For example, as shown in FIG. 3, idler pulley 52 may be engaged with an underside of belt 42, and extension of hydraulic cylinder 58 may cause idler pulley 52 to urge a portion of belt 42 upward for increased tension in belt 42. Conversely, retraction of hydraulic cylinder 58 may cause idler pulley 52 to move downward and be in weaker engagement with belt 42 and thereby reduce tension in belt 42.

In some embodiments, an accumulator (not shown) may be included within the hydraulic cylinder 58 or otherwise coupled thereto. An accumulator may act to absorb energy introduced upon the tensioning system 50 due to changing loads introduced thereto through the belt 42 during operation. The accumulator may function to buffer the tensioning system 50 from the effects of shock induced from changes in load placed on the wood grinder 10, thereby reducing stress placed on the belt tensioning system 50. An accumulator may further provide excess oil to delay leak down of the hydraulic cylinder 58 when the tensioning system 50 is off for an extended period of time.

Figure 4:
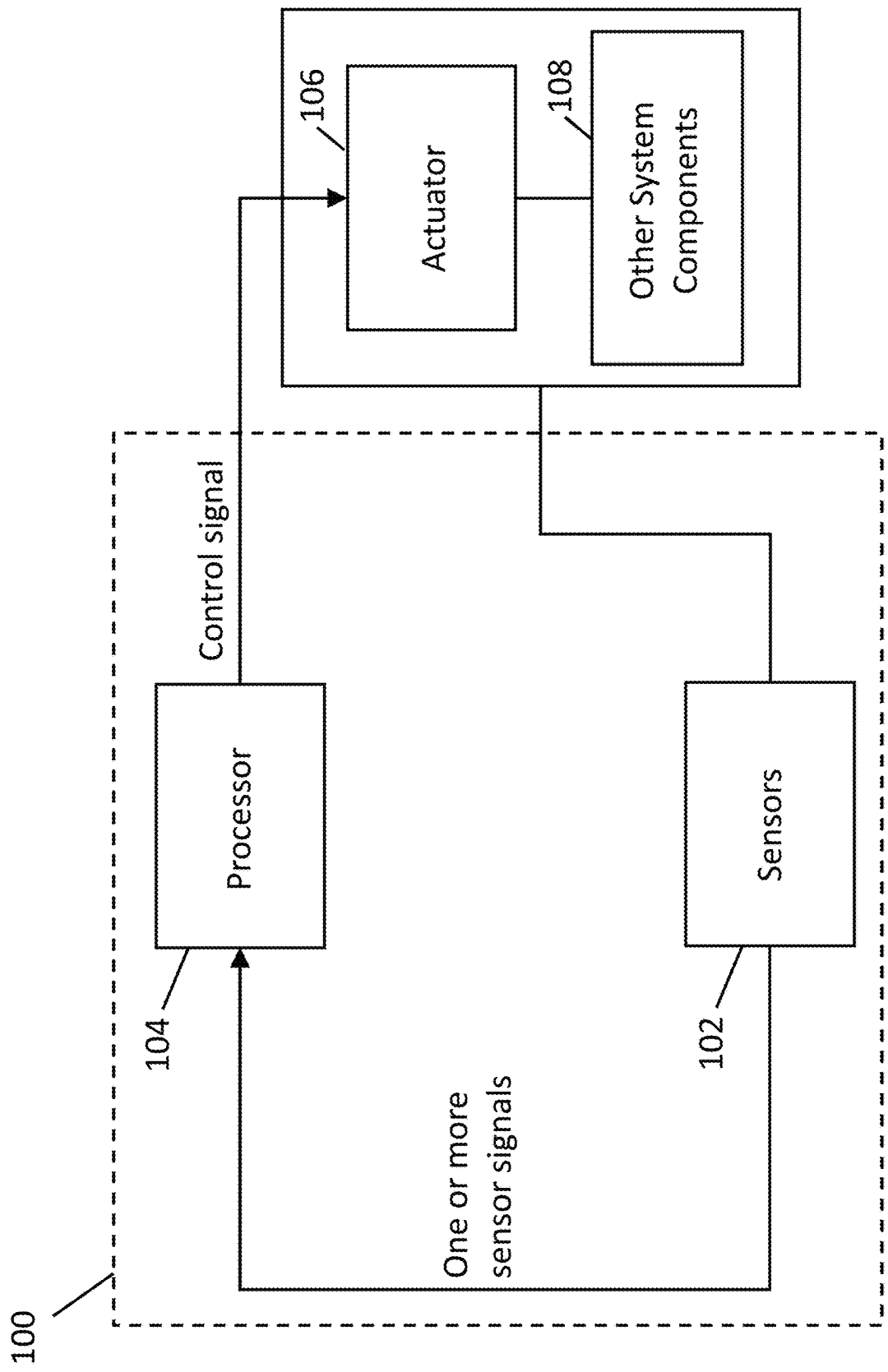
FIG. 4 is a schematic diagram of a control system for a belt tensioning system.

With reference to FIG. 4, belt tensioning system 50 may include an electronic control system 100. The electronic control system 100 may include, for example, a collection of one or more sensors 102 and a computer processor 104. Electronic control system 100 may be configured for generating a control signal for controlling an actuator 106 and changing the position of the idler pulley 52 so as to adjust tension of the belt 42. The collection of sensors 102, which as used herein may include a single sensor or a plurality of sensors, may be used to generate one or more sensor signals. Processor 104 may be configured to receive the one or more sensor signals, process the signals using a control algorithm, and send a control signal to the actuator 106. Actuator 106 may, for example, comprise hydraulic cylinder 58, or another suitable actuator may be used, such as a pneumatic, electric, or other type of actuator. Based on the control signal, actuator 106 may be extended or retracted in order to position the idler pulley 52 for stronger or weaker engagement with the belt 42. For example, actuator 106 may extend so as to push on the idler arm 54 so that it pivots with respect to the frame 12 and directs the idler pulley 52 into stronger engagement with the belt 42, or actuator 106 may retract so as to pull idler arm 54 and thereby direct idler pulley 52 into weaker engagement with belt 42. The collection of sensors 102 may be used to measure one or more properties affected by actuation of the actuator 106. For example, the collection of sensors 102 may include a pressure sensor 70 configured for measuring a change in pressure of the cylinder barrel 62. Other system properties that may be affected by the actuator 106 may include an exerted force on or a position of actuator 106 or various other system components 108. For example, system components 108 that may be modified through adjustment of the actuator 106 may include any of the idler pulley 52, idler arm 54, hinges (56, 66, 68), belt 42, or the sheaves 38, 40. In some embodiments, the collection of sensors 102 may be configured for measuring the force incident upon, position, or other property of the actuator 106, any of the above system components 108, or any combinations thereof. In response to actuation of the actuator 106, the collection of sensors 102 may detect changes in properties of the above components 106, 108 and again generate one or more updated sensor signals. The updated sensor signals may again be fed into or otherwise used by the processor 104 so as to generate an updated control signal for the actuator 106.

The collection of sensors 102, may include, for example, one or more pressure sensors, position sensors, strain gauges, accelerometers, or other suitable sensors. For example, as noted above, where actuator 106 comprises a hydraulic cylinder 58, pressure sensor 70 may be used to measure a signal related to a pressure of the cylinder barrel 62. In some embodiments, one or more strain gauges 72 may be positioned on or within a belt 42. In some embodiments, a load sensor may detect a force that is acting on one or more of the idler arm 54 or the idler pulley 52. For example, a sensor may be positioned at or near one or more of the hinges 66, 68 so as to detect a force or load acting on the hydraulic cylinder 58 through the idler arm 54. A load or force sensor may also be positioned at or near one or more ends of the idler arm 54. For example, a load or force sensor may be positioned adjacent the hinge pin 60. In any event, the one or more sensor signals may be representative of a tension in belt 42.

In some embodiments, computer processor 104 may be mounted to the frame 12 or otherwise positioned via a wired or wireless connection so as to receive sensor signals. In some embodiments, the one or more sensor signals may be provided directly to the computer processor 104 depending, for example, on the form of the one or more signals. For example, if a sensor includes an integrated A/D converter, the sensor may output a digital signal that may be directly sent to the computer processor 104. In some embodiments, the one or more sensor signals may first be passed through one or more amplifiers, A/D converters, or other electronic components so as to condition the signals before the one or more sensor signals are received at the processor 104.

The computer processor 104 may be configured to receive the one or more sensor signals, determine a value for the belt tension based on the one or more sensor signals, and compare the value to one or more belt tension criteria, such as a set point and/or minimum or maximum belt tension values. For example, in some embodiments, the one or more belt tension criteria may be selected from an upper limit, a lower limit, and a combination thereof. When a sensor signal decreases below a minimum value or exceeds a maximum value, a control signal may be emitted from the processor 104 to adjust the actuator 106. In some embodiments, the computer processor 104 may be programmed to receive the one or more sensor signals and calculate a belt tension value. Alternatively, one or more of the sensors 102 may directly output a belt tension value. For example, in some embodiments, the collection of sensors 102 may include a strain gauge sensor 72 configured to directly output a sensor signal representative of a belt tension value. A belt tension value may be compared to one or more reference values. When a belt tension value decreases below a minimum value or exceeds a maximum value, a signal may be emitted from the processor 104 to adjust the actuator 106 and to maintain the tension value within desired limits. In some embodiments, the computer processor 104 may include a display or audio speaker for providing sensor data and/or for providing one or more alarms related to the one or more sensor signals. For example, grinder 10 may be configured to provide an audio or visual alarm if one or more of the sensor signals exceeds one or more alarm thresholds.

Figure 5:
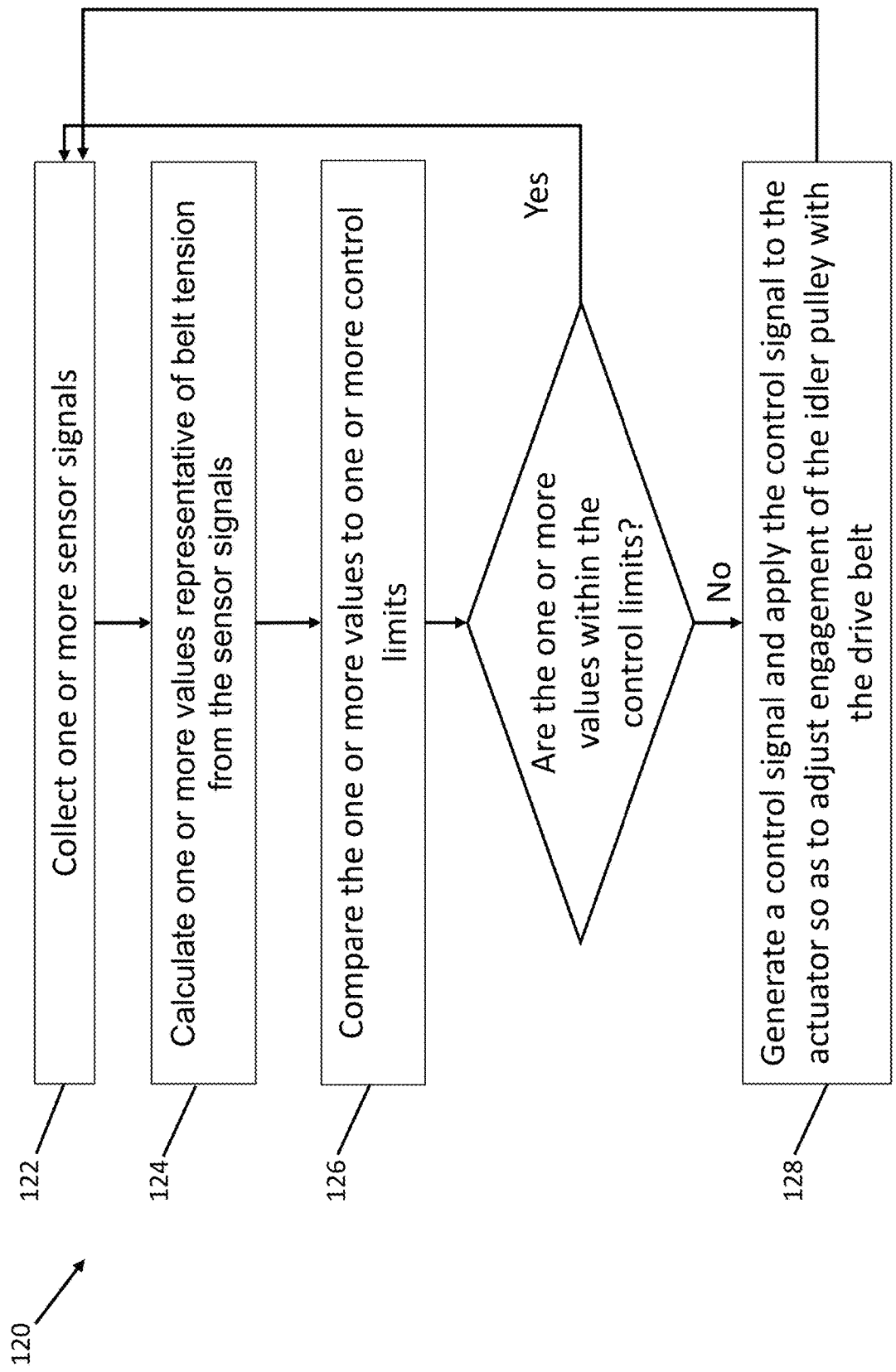
FIG. 5 is a flowchart of a method for controlling belt tension.

FIG. 5 shows an embodiment of a method 120 for controlling or adjusting belt tension. As shown in step 122, one or more sensor signals representative of a belt tension may be collected. In step 124, one or more values representative of a belt tension may be determined from the one or more sensor signals. For example, in some embodiments, one or more strain gauge sensors 72 may be used to collect a sensor signal that may be used to directly calculate a belt tension. Alternatively, one or more other sensor signals (e.g., pressure or force signals) may be collected. Data values determined therefrom may be compared to one or more calibration values or a reference data table so that a belt tension may be derived.

In a step 126, the one or more values representative of belt tension may be compared to one or more control limits. For example, the one or more values representative of belt tension may be compared to each of a maximum allowed belt tension and a minimum allowed belt tension. If the one or more values representative of belt tension are within the desired control limits, no control signal may be sent to the actuator 106. As shown in step 128, if the one or more values representative of belt tension are outside of the desired control limits, a control signal may be generated and sent to the actuator 58, 106. For example, if belt tension has dropped below a minimum desired limit, a control signal may be sent to the hydraulic actuator 58 so that the piston rod 64 is extended. Accordingly, idler arm 54 may be pushed so that it pivots with respect to the frame 12 and the idler pulley 52 positioned for stronger engagement with the belt 42. Alternatively, if belt tension has increased above a maximum desired limit, a control signal may be sent to actuator 58 to retract piston rod 64 so as to relax idler pulley 52 into a weaker engagement with belt 42, so that tension in belt 42 may be adjusted within desired limits.

As described in detail above, the present application is directed to systems and methods for controlling belt tension. For exemplary purposes, an embodiment of a wood grinder including a belt tensioning system has been described. Persons of ordinary skill in the art will understand that a belt tensioning system as described herein may be utilized with any suitable vehicle that contains a power transmission system including a belt. Although the foregoing specific details describe certain embodiments of this invention, persons of ordinary skill in the art will recognize that various changes may be made in the details of this invention without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that this invention is not to be limited to the specific details shown and described herein.

What is claimed is:

1. A work machine for reducing wood infeed material comprising:
    a drive motor mounted to a frame, the drive motor including a drive shaft to which a drive sheave is attached;
    a rotor including a driven sheave and a plurality of cutting tools configured for reducing the wood infeed material;
    a belt operably engaged with the drive sheave and the driven sheave to facilitate rotation of the rotor;
    a belt tensioning system comprising:
        an idler pulley mounted to an idler arm;
        wherein the idler arm is pivotably connected to said frame;
        an actuator directly connected to the idler arm through a hinge, the actuator being configured to move the idler arm so as to adjust a degree of engagement between the idler pulley and said belt; and
    an electronic control system comprising:
        a computer processor configured to receive one or more sensor signals representative of a tension of said belt, determine a value for said tension based on the one or more sensor signals, compare the value to one or more belt tension criteria, and provide a control signal to said actuator if the value does not meet said one or more belt tension criteria, the control signal controlling actuation of the actuator; and
        one or more sensors in communication with the computer processor, the one or more sensors configured to generate said one or more sensor signals.

2. The work machine of claim 1 wherein said one or more sensors comprise a strain gauge positioned on or within said belt.

3. The work machine of claim 1 wherein said one or more sensors comprise a pressure sensor configured for measuring a pressure of a cylinder barrel of said actuator.

4. The work machine of claim 1 wherein said one or more sensors comprise a load sensor mounted between said actuator and said idler arm, the load sensor being configured to calculate a force between said actuator and said idler arm.

5. The work machine of claim 1 wherein said actuator comprises a hydraulic actuator.

6. The work machine of claim 5 wherein said hydraulic actuator comprises an accumulator configured to reduce the effects of shock introduced upon the belt tensioning system from changes in loads placed on the work machine.

7. The work machine of claim 1 wherein said one or more belt tension criteria are selected from an upper limit, a lower limit, and a combination thereof.

8. The work machine of claim 1 wherein the idler pulley is rotatably mounted to said idler arm.

9. A work machine for reducing wood infeed material comprising:
    a drive motor mounted to a frame, the drive motor including a drive shaft to which a drive sheave is attached;
    a rotor including a driven sheave and a plurality of cutting tools configured for reducing the wood infeed material;
    a belt operably engaged with the drive sheave and the driven sheave to facilitate rotation of the rotor;
    a belt tensioning system mounted to said frame comprising:
        an idler pulley connected to an idler arm;
        wherein said idler arm includes a first end and a second end;
        wherein the idler arm is pivotably connected to said frame at said first end, and said idler pulley is rotatably mounted to the idler arm at said second end;
        an actuator directly connected to the idler arm through a hinge, the actuator being configured to move the idler arm so as to adjust a degree of engagement between the idler pulley and said belt; and
    an electronic control system comprising:
        a computer processor configured to receive one or more sensor signals representative of a tension of said belt, determine a value for said tension based on the one or more sensor signals, compare the value to one or more belt tension criteria, and provide a control signal to said actuator if the value does not meet said one or more belt tension criteria, the control signal controlling actuation of the actuator; and
        one or more sensors in communication with the computer processor, the one or more sensors configured to generate said one or more sensor signals.

10. The work machine of claim 9 wherein said actuator is pivotably connected to the idler arm at or near the second end of said idler arm.

11. The work machine of claim 10 wherein said actuator comprises a hydraulic actuator, the hydraulic actuator including an accumulator configured to reduce the effects of shock introduced upon the belt tensioning system from changes in loads placed on the work machine.

12. The work machine of claim 11 wherein said actuator is connected to the idler arm using a connection pin.

13. The work machine of claim 9 wherein said actuator comprises a hydraulic actuator, the hydraulic actuator including an accumulator configured to reduce the effects of shock introduced upon the belt tensioning system from the belt.

14. The work machine of claim 9 wherein said one or more belt tension criteria are selected from an upper limit, a lower limit, and a combination thereof.

15. The work machine of claim 9 wherein said one or more sensors comprise a strain gauge positioned on or within said belt.

16. The work machine of claim 9 wherein said one or more sensors comprise a pressure sensor configured for measuring a pressure of a cylinder barrel of said actuator.

17. The work machine of claim 9 wherein said one or more sensors comprise a load sensor mounted between said actuator and said idler arm, the load sensor being configured to calculate a force between said actuator and said idler arm.

18. The work machine of claim 9 wherein the idler pulley is engaged with an outer surface of the belt.

19. The work machine of claim 18 wherein extension of the actuator presses the idler pulley into stronger engagement with the belt and retraction of the actuator presses the idler pulley into weaker engagement with the belt.

20. The work machine of claim 19 wherein the belt is configured in a closed loop and said extension presses a portion of the belt toward an interior of the closed loop.

\* \* \* \* \*